United States Patent
Shatsky et al.

(10) Patent No.: US 12,367,216 B2
(45) Date of Patent: Jul. 22, 2025

(54) DISTRIBUTION OF COPIES OF METADATA ASSOCIATED WITH PROCESSING GROUPS AMONG STORAGE NODES OF A DATA STORAGE SYSTEM

(71) Applicant: Dell Products L.P., Round Rock, TX (US)

(72) Inventors: Yosef Shatsky, Karnei Shomron (IL); Doron Tal, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/505,337

(22) Filed: Nov. 9, 2023

(65) Prior Publication Data
US 2025/0156443 A1    May 15, 2025

(51) Int. Cl.
*G06F 16/27*    (2019.01)
*G06F 16/2457*    (2019.01)

(52) U.S. Cl.
CPC ...... *G06F 16/278* (2019.01); *G06F 16/24573* (2019.01)

(58) Field of Classification Search
CPC .. G06F 16/1748; G06F 16/128; G06F 16/164; G06F 16/215; G06F 16/27; G06F 16/278
USPC ......................................................... 707/634
See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 8,843,676 B2 | 9/2014 | Rajamanickam et al. | |
| 9,372,751 B2 | 6/2016 | McNutt | |
| 9,514,014 B2 | 12/2016 | Webman et al. | |

(Continued)

FOREIGN PATENT DOCUMENTS

| | | |
|---|---|---|
| WO | 2015108670 A1 | 7/2015 |
| WO | 2020204880 A1 | 10/2020 |
| WO | 2020204882 A1 | 10/2020 |

OTHER PUBLICATIONS

International Search Report and Written Opinion of PCT/US2019/024885 dated Jan. 7, 2020, 13 pages.

(Continued)

*Primary Examiner* — Hung T Vy
(74) *Attorney, Agent, or Firm* — Ryan, Mason & Lewis, LLP

(57) ABSTRACT

An apparatus comprises at least one processing device configured to determine a given portion of metadata associated with a given one of a plurality of processing groups, the given processing group being assigned to a given one of a plurality of storage nodes of a data storage system. The at least one processing device is also configured to generate two or more copies of the given portion of the metadata, and to select two or more of the plurality of storage nodes of the data storage system on which to store the two or more copies, the two or more storage nodes being selected based at least in part on the assignment of the given processing group to the given storage node. The at least one processing device is further configured to store the two or more copies of on the selected two or more storage nodes.

20 Claims, 6 Drawing Sheets

(56) References Cited

U.S. PATENT DOCUMENTS

| | | |
|---|---|---|
| 9,892,045 B1 | 2/2018 | Douglis et al. |
| 10,078,598 B1 | 9/2018 | Wallace et al. |
| 10,331,561 B1 | 6/2019 | Shilane et al. |
| 10,445,180 B2 | 10/2019 | Butterworth et al. |
| 10,986,174 B1 | 4/2021 | Sharma et al. |
| 11,119,668 B1 | 9/2021 | Keller et al. |
| 11,144,399 B1 | 10/2021 | Yarimi et al. |
| 11,163,479 B2 | 11/2021 | Lieblich et al. |
| 11,163,699 B2 | 11/2021 | Keller et al. |
| 11,221,975 B2 | 1/2022 | Puder et al. |
| 11,262,933 B2 | 3/2022 | Matosevich et al. |
| 11,301,162 B2 | 4/2022 | Matosevich et al. |
| 11,307,935 B2 | 4/2022 | Keller et al. |
| 11,372,810 B2 | 6/2022 | Keller et al. |
| 11,416,396 B2 | 8/2022 | Shatsky et al. |
| 11,418,589 B1 | 8/2022 | Spiegelman |
| 11,487,432 B2 | 11/2022 | Aharoni et al. |
| 11,487,460 B2 | 11/2022 | Keller et al. |
| 11,513,997 B2 | 11/2022 | Keller et al. |
| 11,550,479 B1 | 1/2023 | Shatsky et al. |
| 11,573,736 B2 | 2/2023 | Matosevich et al. |
| 11,606,429 B2 | 3/2023 | Aharoni et al. |
| 11,609,854 B1 | 3/2023 | Shatsky et al. |
| 11,630,773 B1 | 4/2023 | Shatsky et al. |
| 11,636,089 B2 | 4/2023 | Aharoni et al. |
| 11,650,920 B1 | 5/2023 | Shatsky et al. |
| 11,675,789 B2 | 6/2023 | Shatsky et al. |
| 11,687,536 B2 | 6/2023 | Sharma et al. |
| 11,704,053 B1 | 7/2023 | Tal et al. |
| 11,704,160 B2 | 7/2023 | Shatsky et al. |
| 11,733,874 B2 | 8/2023 | Matosevich et al. |
| 11,789,917 B2 | 10/2023 | Tal et al. |
| 11,809,274 B2 | 11/2023 | Tal et al. |
| 2002/0032835 A1 | 3/2002 | Li et al. |
| 2008/0021853 A1 | 1/2008 | Modha et al. |
| 2009/0204761 A1 | 8/2009 | Caprioli et al. |
| 2009/0276593 A1 | 11/2009 | Jacobson et al. |
| 2013/0305002 A1 | 11/2013 | Hallak et al. |
| 2014/0215147 A1 | 7/2014 | Pan |
| 2014/0215262 A1 | 7/2014 | Li et al. |
| 2014/0244935 A1* | 8/2014 | Ezra .................... G06F 3/0614 711/133 |
| 2016/0103764 A1 | 4/2016 | Banerjee et al. |
| 2018/0113640 A1 | 4/2018 | Fernandez et al. |
| 2018/0267893 A1 | 9/2018 | Barzik et al. |
| 2018/0300075 A1 | 10/2018 | Fernandez et al. |
| 2019/0163587 A1 | 5/2019 | Anna et al. |
| 2019/0227845 A1 | 7/2019 | Sridhar et al. |
| 2020/0133503 A1 | 4/2020 | Sun et al. |
| 2021/0279187 A1 | 9/2021 | Puder et al. |
| 2021/0294505 A1 | 9/2021 | Keller et al. |
| 2021/0294774 A1 | 9/2021 | Keller et al. |
| 2021/0294775 A1 | 9/2021 | Keller et al. |
| 2021/0303160 A1 | 9/2021 | Lieblich et al. |
| 2021/0303169 A1 | 9/2021 | Tagar et al. |
| 2021/0303202 A1 | 9/2021 | Ben Zeev et al. |
| 2021/0303401 A1 | 9/2021 | Keller et al. |
| 2021/0303407 A1 | 9/2021 | Keller et al. |
| 2021/0303480 A1 | 9/2021 | Yarimi et al. |
| 2021/0373796 A1 | 12/2021 | Matosevich et al. |
| 2022/0004320 A1 | 1/2022 | Matosevich et al. |
| 2022/0035788 A1 | 2/2022 | Aharoni et al. |
| 2022/0108167 A1* | 4/2022 | Upadhyay ............... G06F 3/061 |
| 2022/0113867 A1 | 4/2022 | Aharoni et al. |
| 2022/0114184 A1 | 4/2022 | Sharma et al. |
| 2022/0116454 A1 | 4/2022 | Aharoni et al. |
| 2022/0121458 A1 | 4/2022 | Moran et al. |
| 2022/0129380 A1 | 4/2022 | Shatsky et al. |
| 2022/0171567 A1 | 6/2022 | Matosevich et al. |
| 2022/0187991 A1 | 6/2022 | Keller et al. |
| 2022/0222113 A1 | 7/2022 | Shatsky et al. |
| 2022/0342758 A1 | 10/2022 | Tal et al. |
| 2022/0350497 A1 | 11/2022 | Matosevich et al. |
| 2022/0358018 A1 | 11/2022 | Bar Shalom et al. |
| 2022/0405254 A1 | 12/2022 | Shatsky et al. |
| 2022/0414102 A1 | 12/2022 | Shatsky et al. |
| 2023/0127321 A1 | 4/2023 | Shatsky et al. |
| 2023/0236966 A1 | 7/2023 | Yarimi et al. |
| 2023/0237029 A1 | 7/2023 | Tal et al. |
| 2023/0273877 A1 | 8/2023 | Shatsky et al. |
| 2023/0342212 A1 | 10/2023 | Shatsky et al. |
| 2023/0342221 A1 | 10/2023 | Brener-Shalem et al. |

OTHER PUBLICATIONS

International Search Report and Written Opinion of PCT/US2019/024900 dated Jan. 7, 2020, 12 pages.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," IEEE Symposium on High-Performance Computer Architecture, Feb. 11-15, 2006, pp. 200-211.
Wikipedia, "Raft (Computer Science)," https://en.wikipedia.org/wiki/Raft_(computer_science), Feb. 10, 2020, 4 pages.
Wikipedia, "Paxos (Computer Science)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
Dell EMC, "Getting to Know Dell EMC PowerFlex," Version 3.5.x, Rev. 02, Jan. 2021, 66 pages.
Dell EMC, "Dell EMC VxRack Flex," Dell EMC Product Overview, Apr. 2018, 5 pages.
G. Soundararajan et al., "Dynamic Resource Allocation for Database Servers Running on Virtual Storage," Fast 2009: Proceedings of the 7th conference on File and storage technologies, Feb. 2009, pp. 71-84.
U.S. Appl. No. 17/853,364 filed in the name of Yosef Shatsky et al. on Jun. 29, 2022, and entitled "Managing Lookup Operations of a Metadata Structure for a Storage System."
U.S. Appl. No. 17/864,579 filed in the name of Yosef Shatsky et al. on Jul. 14, 2022, and entitled "Managing Granularity of a Metadata Structure for a Storage System."
U.S. Appl. No. 17/868,045 filed in the name of Yosef Shatsky et al. on Jul. 19, 2022, and entitled "Managing Insert Operations of a Metadata Structure for a Storage System."
U.S. Appl. No. 17/969,875 filed in the name of Yosef Shatsky et al. on Oct. 20, 2022, and entitled "Multiple-Instance Write Cache for a Storage System."
U.S. Appl. No. 18/090,792 filed in the name of Christopher Trudel et al. on Dec. 29, 2022, and entitled "Cluster Management in Large-Scale Storage Systems."
U.S. Appl. No. 18/092,516 filed in the name of Igal Moshkovich et al. on Jan. 3, 2023, and entitled "Managing Data on Shutdown of Storage System."
U.S. Appl. No. 18/138,415 filed in the name of Yosef Shatsky et al. on Apr. 24, 2023, and entitled "Dynamic Reserve Capacity in Storage Systems."

(56) References Cited

OTHER PUBLICATIONS

U.S. Appl. No. 18/138,415 filed in the name of Doron Tal et al. on Jul. 13, 2023, and entitled "Multi-Modal Write Cache for Data Storage System."
U.S. Appl. No. 18/362,088 filed in the name of Yosef Shatsky et al. on Jul. 31, 2023, and entitled "Facilitating Access to Fragmented Snapshot Data."

* cited by examiner

200

300

DISTRIBUTION OF COPIES OF METADATA ASSOCIATED WITH PROCESSING GROUPS AMONG STORAGE NODES OF A DATA STORAGE SYSTEM

BACKGROUND

Information processing systems often include distributed arrangements of multiple nodes, also referred to herein as distributed processing systems. Such systems can include, for example, distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. Data within the system is partitioned, striped, and replicated across the distributed storage nodes. For a storage administrator, the software-defined storage system provides a logical view of a given dynamic storage pool that can be expanded or contracted at ease, with simplicity, flexibility, and different performance characteristics. For applications running on a host device that utilizes the software-defined storage system, such a storage system provides a logical storage object view to allow a given application to store and access data, without the application being aware that the data is being dynamically distributed among different storage nodes potentially at different sites.

SUMMARY

Illustrative embodiments of the present disclosure provide techniques for distribution of copies of metadata associated with processing groups among storage nodes of a data storage system.

In one embodiment, an apparatus comprises at least one processing device comprising a processor coupled to a memory. The at least one processing device is configured to determine a given portion of metadata associated with a given one of a plurality of processing groups, the given processing group being assigned to a given one of a plurality of storage nodes of a data storage system. The at least one processing device is also configured to generate two or more copies of the given portion of the metadata associated with the given processing group, and to select two or more of the plurality of storage nodes of the data storage system on which to store the two or more copies of the given portion of the metadata associated with the given processing group, wherein the two or more storage nodes are selected based at least in part on the assignment of the given processing group to the given storage node. The at least one processing device is further configured to store the two or more copies of the given portion of the metadata associated with the given processing group on the selected two or more storage nodes.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1A:
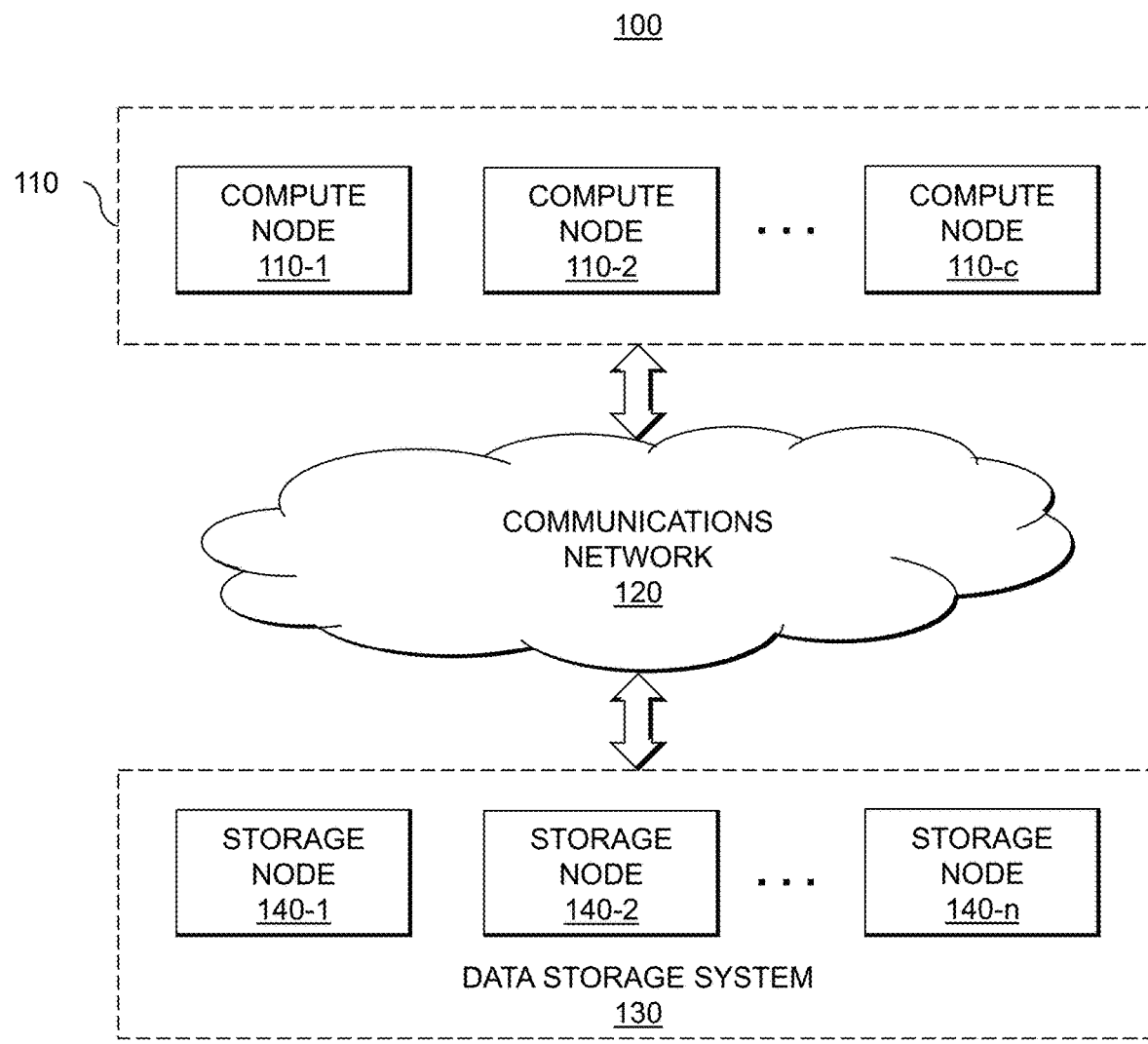
FIGS. 1A and 1B are block diagrams of an information processing system configured for distribution of copies of metadata associated with processing groups among storage nodes of a data storage system in an illustrative embodiment.
Figure 1B:
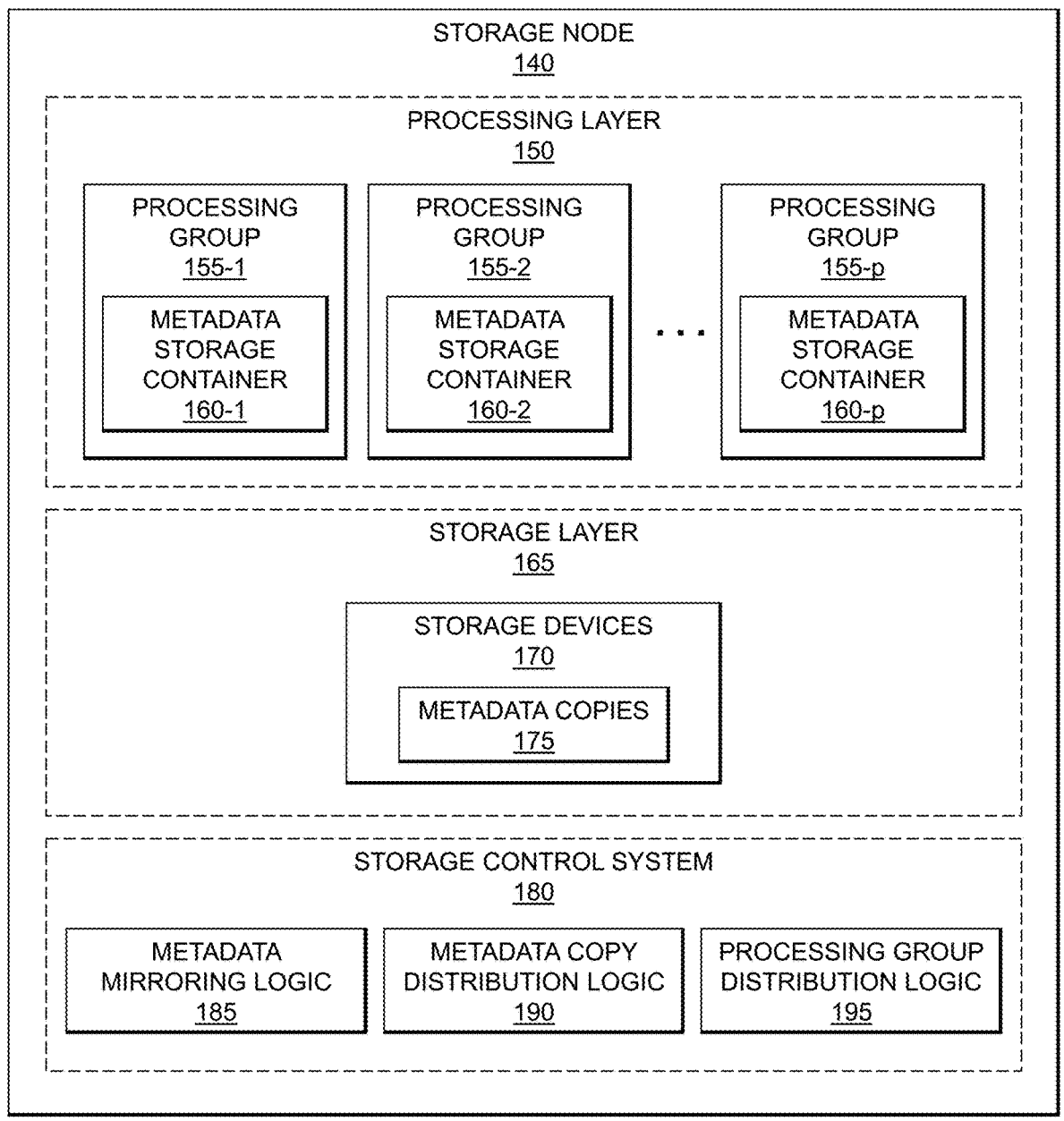

FIGS. 1A and 1B schematically illustrate an information processing system configured to implement functionality for distribution of copies of metadata associated with processing groups among storage nodes of a data storage system. More specifically, FIG. 1A schematically illustrates an information processing system 100 which comprises a plurality of compute nodes 110-1, 110-2, . . . , 110-c (collectively referred to as compute nodes 110), a communications network 120, and a data storage system 130. The data storage system 130 comprises a plurality of storage nodes 140-1, 140-2, . . . , 140-n (collectively referred to as storage nodes 140, or each singularly referred to as storage node 140). The storage nodes 140 may comprise, for example, server nodes or other types of storage nodes. In some embodiments, the data storage system 130 comprises a compression-enabled data storage system which supports in-line compression of data that is stored in the storage media that is accessed and controlled by the storage nodes 140. FIG. 1B schematically illustrates an exemplary framework of at least one or more of the storage nodes 140.

The compute nodes 110 illustratively comprise physical compute nodes and/or virtual compute nodes which process data and execute workloads. For example, the compute nodes 110 can include one or more servers (e.g., bare metal servers) and/or one or more virtual machines. In some embodiments, the compute nodes 110 comprise a cluster of physical servers or other types of computers of an enterprise computer system, cloud-based computing system or other arrangement of multiple compute nodes associated with respective users. In some embodiments, the compute nodes 110 include a cluster of virtual machines that execute on one or more physical servers.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue input-output (IO) requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCOE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly constructed and not viewed as being limited to storage systems of any particular type or types. In some embodiments, the storage nodes 140 comprise one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

As shown in FIG. 1B, the storage node 140 comprises a processing layer 150, a storage layer 165, and a storage control system 180. The processing layer 150 comprises a set of processing groups 155-1, 155-2, . . . 155-$p$ (collectively, processing groups 155) each having an associated metadata storage container 160-1, 160-2, . . . 160-$p$ (collectively, metadata storage containers 160). The storage layer 165 comprises a plurality of storage devices 170 having storage capacity for storing data. At least a portion of the storage capacity of the storage devices 170 is utilized for storing metadata copies 175 including the metadata of the metadata storage containers 160 associated with the processing groups 155, as will be discussed in further detail below.

In some embodiments, as schematically illustrated in FIG. 1B, the storage node 140 is a physical server or storage appliance, wherein the storage devices 170 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 170 may be implemented in the storage node 140. In this regard, the term "storage device" as used herein is intended to be broadly construed, so as to encompass, for example, SSDs, HDDs, flash drives, hybrid drives or other types of storage media. The storage devices 170 are connected to the storage node 140 through any suitable host interface, e.g., a host bus adapter, using suitable protocols such as ATA, SATA, eSATA, NVMe, SCSI, SAS, etc. In other embodiments, the storage node 140 can be network connected to one or more NAS nodes over a local area network.

The storage control system 180 is configured to manage the storage devices 170 and control IO access to the storage devices 170 and/or other storage resources (e.g., DAS or NAS resources) that are directly attached or network-connected to the storage node 140. In some embodiments, the storage control system 180 is a component (e.g., storage data server) of a software-defined storage (SDS) system which supports the virtualization of the storage devices 170 by separating the control and management software from the hardware architecture. More specifically, in a software-defined storage environment, the storage control system 180 comprises an SDS storage data server that is configured to abstract storage access services from the underlying storage hardware to thereby control and manage IO requests issued by the compute nodes 110, as well as to support networking and connectivity. In this instance, the storage control system 180 comprises a software layer (e.g., the processing layer 150) that is hosted by the storage node 140 and deployed in the data path between the compute nodes 110 and the storage devices 170 of the storage node 140, and is configured to respond to data IO requests from the compute nodes 110 by accessing the storage devices 170 to store/retrieve data to/from the storage devices 170 based on the IO requests.

In a software-defined storage environment, the storage control system 180 is configured to provision, orchestrate and manage the local storage resources (e.g., the storage devices 170) of the storage node 140. For example, the storage control system 180 implements methods that are configured to create and manage storage pools (e.g., virtual pools of block storage) by aggregating capacity from the storage devices 170. The storage control system 180 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the software-defined storage environment, each of the storage nodes 140 in FIG. 1A can run an instance of the storage control system 180 to convert the respective local storage resources (e.g., DAS storage devices and/or NAS storage devices) of the storage nodes 140 into local block storage. Each instance of the storage control system 180 contributes some or all of its local block storage (HDDs, SSDs, PCIe, NVMe and flash cards) to an aggregated pool of storage of a storage node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage control system 180 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage control systems 180 operating as SDS storage data servers to create and expose volumes of a storage layer, the software-defined storage environment comprises other components such as (i) SDS data clients that consume the storage layer 165 and (ii) SDS metadata managers that coordinate the storage layer 165, which are not specifically shown in FIGS. 1A and 1B. More specifically, on the client-side (e.g., compute nodes 110), an SDS data client (SDC) is a lightweight block device driver that is deployed on each server that consumes the shared block storage volumes exposed by the storage control systems 180. In particular, the SDCs run on the same servers as the compute nodes 110 which require access to the block devices that are exposed and managed by the storage control systems 180 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage control systems 180. The SDC provides the operating system or hypervisor (which runs the SDC) access to the logical block devices (e.g., volumes).

The SDCs have knowledge of which SDS control systems (e.g., storage control system 180) hold its block data, so multipathing can be accomplished natively through the SDCs. In particular, each SDC knows how to direct an IO request to the relevant destination SDS storage data server (e.g., storage control system 180). In this regard, there is no central point of routing, and each SDC performs its own routing independent from any other SDC. This implementation prevents unnecessary network traffic and redundant SDS resource usage. Each SDC maintains peer-to-peer connections to every storage control system 180 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The SDS metadata manager components are deployed on multiple servers and operate in a manner which forms a tightly coupled cluster that is configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that is required for system operation of the SDS environment such as configuration changes, managing the SDS data clients and data servers, device mapping, values, snapshots, system capacity including device allocations and/or release of capacity, RAID protection, errors and failures, and system rebuild tasks including rebalancing.

Regardless of the specific implementation of the storage environment, as noted above, the the storage control system 180 of FIG. 1B may provide data storage and management functionality configured to, e.g., (i) divide the storage capacity of the storage devices 170 into storage pools and logical volumes, (ii) organize the storage capacity of the storage pools/volumes pools into a plurality of log-structured arrays, and (iii) store compressed data and non-compressed data in log segments of the log-structured arrays. In particular, a suitable logical volume management (LVM) system may be implemented which is configured to create and manage local storage volumes by aggregating the storage devices 170 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data.

In some embodiments, the storage pools are utilized to group storage devices based on device types and performance. For example, SSDs are grouped into SSD pools, and HDDs are grouped into HDD pools. Furthermore, in some embodiments, the storage control system 180 implements methods to support various data storage management services such as data protection, data migration, data deduplication, replication, thin provisioning, snapshots, data backups, etc.

Data compression functionality is configured to support in-line compression of data that is written to the log-structured array (LSA) storage, and in-line decompression of compressed data that is read from the LSA storage. In particular, one or more types of data compression techniques may be implemented to compress IO write data that is provided with an IO write request. For a write IO operation, the associated IO write data is divided into blocks, and each block is separately compressed. Various data compression techniques may be utilized including, but not limited to, Lempel-Ziv (LZ) compression, Lempel-Ziv-Welch (LZW) compression, other variants of LZ compression, Huffman encoding, run-length encoding, etc., and other types of data compression techniques which are suitable for the expected types of data that are to be stored for a given application.

Data decompression functionality is configured to decompress compressed data that is read from the LSA storage in response to IO read requests. In particular, when compressed data is accessed from the LSA storage, the compressed data is decompressed using a decompression process which corresponds to the process that was used to compress the data. The decompressed data is then returned in response to the IO read request.

The storage control system 180 may provide functionality for determining the "compressibility" of data that is to be written to the LSA storage. With regard to a given block of IO write data, the term "compressibility" as used herein broadly refers to (i) a level of data compression that can be obtained for the given block of IO write data or (ii) a degree to which a size of the given block of IO write data can be reduced by data compression. The data placement techniques implemented by the storage control system 180 are based, in part, on the understanding that not all data is compressible. For example, when data compression is performed on data that is essentially incompressible, the size of the resulting "compressed" data may be the same or greater than the size of the original, non-compressed data. For example, incompressible data can include pre-compressed content (e.g., compressed audio and video), or pure random data.

The compressibility of IO write data can be determined in various ways. For example, in some embodiments, any compression product that yields a size which is greater than some predefined size threshold T is deemed, in effect, to be incompressible:

$$IsCompressible\,(\text{data}) = \begin{cases} \text{TRUE}, & \text{size (compress (data))} \leq T \\ \text{FALSE}, & \text{otherwise} \end{cases}$$

In other embodiments, the compressibility of IO write data can be determined by (i) computing a "compressibility value" as a function of a size of the IO write data and a size of the compressed IO write data, and (ii) comparing the computed "compressibility value" to a predefined "compressibility threshold value" to determine whether a level of data compression of the compressed IO write data meets or exceeds a target minimum level of data compression. For example, in some embodiments, a compressibility value of IO write data can be expressed in terms of a compression ratio R value, which is computed as a ratio of the size of the original (non-compressed) IO write data to the size of the compressed IO write data, as follows:

$$CompressionRatio\,(\text{data}) : R = \frac{\text{size (data)}}{\text{size (compress (data))}}$$

For example, a data compression process which compresses data from a size of 20 Kilobytes (KB) to a size of 4 KB yields a compression ratio R of 20/4=5, or a ratio of 5:1. In this instance, any compression product that yields a compression ratio R which is greater than or equal to a predefined compression ratio threshold $R_{Threshold}$ can be deemed compressible, while any compression product that yields a compression ratio R which is less than the predefined compression ratio threshold $R_{Threshold}$ is deemed, in effect, to be incompressible. In some embodiments, the compression ratio threshold $R_{Threshold}$ may be 1.25. In this embodiment, the compression ratio threshold $R_{Threshold}$ is an exemplary "compressibility threshold value."

In other embodiments, the compressibility of IO write data can be determined based on a computation of a compressibility value C, where $$C = 1/R = \frac{\text{size (compress (data))}}{\text{size (data)}}.$$

For example, assuming the data compression process results in the reduction of the size of data from 20 KB to 4 KB, the computation of the compressibility value C=4/20, yields of value of 0.2. The compressibility value C can be compared to a predefined compressibility threshold value $C_{Threshold}$ to determine if a given block of data is deemed compressible or incompressible. For example, in some embodiments, an exemplary compressibility threshold value is set to $C_{Threshold}=0.8$ (which corresponds to a compression ratio R=1.25). In this instance, any compression product that yields a compressibility value C which is less than or equal to $C_{Threshold}$ is deemed compressible, while any compression product that yields a compressibility value C which is greater than $C_{Threshold}$ is deemed, in effect, to be incompressible.

In other embodiments, a "compressibility value" for IO write data can be expressed in terms of a space savings value S, which represents a reduction in the size of the compressed IO write data relative to the non-compressed size of the IO write data. In particular, the space savings value S is computed as follows:

$$SpaceSavings\,(\text{data}) : S = 1 - \left(\frac{\text{size (compress (data))}}{\text{size (data)}}\right)$$

For example, assuming a data compression process results in the reduction in the size of IO write data from 20 KB to 4 KB, the computation of S=1−(4/20) yields a space savings value S of 0.8 (or 80%). The space savings value S can be compared to a predefined space savings threshold value $S_{Threshold}$ to determine if a given block of data is deemed compressible or incompressible. For example, in some embodiments, an exemplary space savings threshold value is set to $S_{Threshold}=0.2$ (which corresponds to $C_{Threshold}=0.8$ or $R_{Threshold}=1.25$). The value of $S_{Threshold}=0.2$ corresponds to at least a 20% reduction in the size of the compressed IO write data relative to the non-compressed size of the IO write data. In this instance, any compression product that yields a space savings value S which is greater than or equal to $S_{Threshold}$ is deemed compressible, while any compression product that yields a space savings value S which is less than $S_{Threshold}$ is deemed, in effect, to be incompressible. In this embodiment, the space savings threshold value $S_{Threshold}$ is an exemplary "compressibility threshold value."

Figure 2:
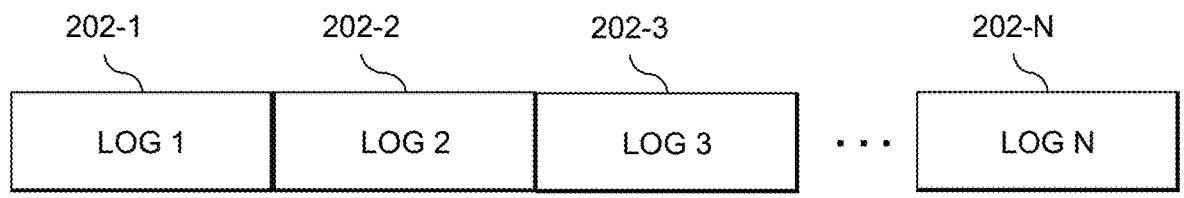
FIG. 2 shows an example log-structured array which may store compressed and uncompressed data in an illustrative embodiment.

The storage control system 180 may create and manage LSAs within the storage pools/volumes of the storage devices 170. For example, FIG. 2 illustrates a log-structured array 200 which can be created and utilized by the storage control system 180 to store compressed and uncompressed data. The log-structured array 200 comprises an array of N log segments 202-1, 202-2, 202-3, . . . , 202-N (collectively, or individually referred to as log segments 202, or logs 202). In some embodiments, the log-structured array 200 is implemented in one or more block storage devices, wherein each block storage device comprises a physical storage space divided into a plurality of logical data blocks (e.g., fixed-size allocation units), wherein the logical data blocks each comprise a separately addressable unit of the physical storage space with a specified block size (e.g., allocation unit size). Each logical data block (e.g., allocation unit) comprises a same number of one or more physical data blocks of the underlying storage media.

In the LSA layout, each log segment 202 of the log-structured array 200 comprises a set of contiguous logical data blocks of the physical storage space. The log segments 202 can reside in the same block device or be distributed over multiple block devices, depending on the configuration of the block storage devices. In some embodiments, the log segments 202 are equal in size (e.g., the log segments 202 each include the same number of logical data blocks). For example, assuming that each logical block (e.g., cluster of sectors on HDD, or page of SSD) is 4 KB, and that each log segment 202 has a segment size of 256 KB, then each of the N log segments 202 comprises a consecutive sequence of 64 logical data blocks within the LSA storage space.

Whenever a user-offset is written to a logical block address, the data is placed in a given log segment 202 which has enough vacancy to host the data. For example, when new data is written to LSA storage, the new data is appended to the end of a given log segment 202 which has sufficient room. In addition, metadata updates comprising log indexing information and other types of metadata are also appended to the given log segment 202 when data is written to the given log segment 202. In this regard, each log segment 202 will include a sequence of appended data entries comprising blocks of data and blocks of indexing metadata. Furthermore, when a modified data block comprising non-compressed data is re-written to LSA storage, the modified data block may be written to the same log entry location(s) as the original data (referred to as "in-place update"). On the other hand, when a modified data block comprising compressed data is rewritten to the LSA storage, the modified data may be written to one or more new log entry locations in a log segment which has vacancy (referred to as "out-of-place update"), wherein an out-of-place update invalidates the original compressed data that is held in one or more existing log entries. In some cases, modifications for both uncompressed and compressed data may be written to one or more new log entry locations in a log segment which has vacancy, e.g., out-of-place updates may be utilized for modifications to both uncompressed and compressed data.

The storage control system 180 may be configured to generate log metadata that is included in metadata log entries that are appended to data entries in the log segments of the log-structured arrays. The log metadata entries comprise indexing information (e.g., pointers) that is included within the log segment to provide fast random access to data entries within the log segments, as well as information that describes the data entries (e.g., valid, not valid, compressed, uncompressed, etc.) within the log segment, and other information such as checksums for error detection, etc. The type of information and data structures that are used to implement the log metadata will vary depending on the application. For example, in some embodiments, the log metadata can be implemented using hash table data structures, B-tree data structures, bitmaps, linked-lists, or other suitable data structures for organizing the log indexing information.

An LSA directory stores mapping information which maps logical block addresses to physical block addresses of log entries within the log-structured arrays. In some embodiments, the LSA directory is maintained in non-volatile system memory. In some embodiments, the logical block addresses of logical devices are mapped to physical data entries in the LSA. The LSA directory provides information that maps each logical block address to a current block location in the LSAs. For example, an entry in the LSA directory for a given logical block provides the physical ID and location of the log segment which stores the logical block, the starting location in the log segment (offset) and length in physical device units (e.g., sectors) to which the logical block is mapped. The LSA directory can be implemented using any suitable type of directory data structure and directory implementation algorithm. For example, in some embodiments, the LSA directory can implement a hash table which comprises key-value pairs. In some embodiments, the directory information within the LSA directory is used to determine the location of a given log segment that holds the data of a given logical block, while the metadata indexing entries within the given log segment are utilized to determine the location of the corresponding data within the log segment.

The storage control system 180 may further implement methods for storing both compressed and non-compressed data entries within log segments of the LSAs in a way that minimizes IO amplification (e.g., read amplification and write amplification) and enhances overall data access and management efficiency. The term "IO amplification" refers to a broad set of circumstances in which an IO request triggers multiple, undesirable IO operations (e.g., the file system needs to perform multiple IO operations to successfully service the initial IO request). For example, a "read-modify-write" is one type of write operation that leads to IO amplification because such write operation requires performing a read operation to read an entire logical data block (allocation unit) of existing data, modifying a portion of the data within the logical data block, and then rewriting the entire logical data block with the modified data back to disk. The "read-modify-write" process increases both read and write amplification due to the need to read extra data that is not the target of the IO write request, and then rewrite such extra (unmodified) data along with the modified data back to disk.

The storage control system 180 may further implement methods for defragmenting log segments within the LSAs. The physical location of data within log segments of the LSAs will change over time as a result of out-of-place writes that are performed when writing modified blocks of compressed data to new log entries that are appended to the end of a given log segment. The out-of-place writes result in invalid blocks of data which cannot be reused until they are reclaimed. In addition, due to the runtime variation of data compressibility, some or all data entries that contain compressed data can have unused storage space that remains after filling the data entries with compressed data. The invalid data entries (and their corresponding metadata entries) together with the unused space in data entries with compressed data collectively form "gaps" in the log segments. The storage control system 180 may periodically perform a defragmentation process to consolidate such "gaps" into free storage space within the log segments that can be used to store new data.

Figure 3:
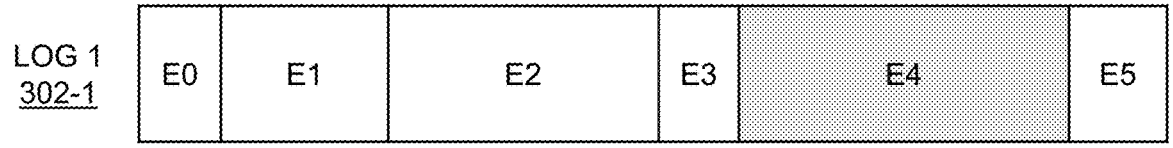
FIG. 3 shows an example log-structured array comprising multiple log segments and a data placement process for storing compressed data in log entries of the log segments in an illustrative embodiment.
Figure 3:
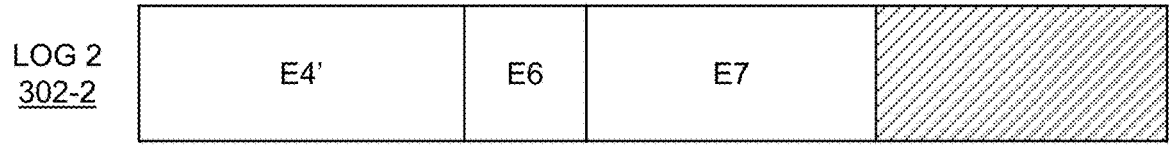

In a compression-enabled storage system which utilizes an LSA storage architecture to store compressed data, whenever a user-offset is written, the compressed data is placed into a log segment that has enough vacancy to host the compressed data. In particular, the new data is placed into a new log entry that is appended to the last log entry of the log segment. For example, FIG. 3 schematically illustrates an LSA comprising multiple log segments, and a process for storing compressed data into log entries of the log segments. In particular, FIG. 3 illustrates an LSA 300 comprising a plurality of log segments (or logs) including a first log segment 302-1 (LOG 1) and a second log segment 302-2 (LOG 2), wherein each log segment 302-1 and 302-2 comprises a plurality of log data entries, generally denoted E (i).

In particular, the first log segment 302-1 comprises log data entries E0, E1, E2, E3, E4, and E5, and the second log segment 302-2 comprises log data entries E4', E6, and E7. The log data entries E (i) are shown to have variable sizes as the log data entries store compressed data. For ease of illustration, the metadata descriptors of the log data entries are not shown. The shaded region of the first log segment 302-1 represents a region with invalid (stale) data, and the striped region within the second log segment 302-2 represents a "logically" vacant region (e.g., logical data blocks that are vacant and can be used to store new data entries). FIG. 3 illustrates a state in which the compressed data of the log data entry E4 in the first log segment 302-1 has been updated and rewritten into the second log segment 302-2 as log data entry E4'. In this instance, the log data entry E4 is no longer valid, thus resulting in a "gap" in the first log segment 302-1.

In some approaches where an LSA storage system stores compressed data, whenever a user-offset is rewritten (e.g., the log data entry E4 of the first log segment 302-1 is rewritten to the new log data entry E4' in the second log segment 302-2), no effort is made to fit the new data into the location (log entry) of the older data. Instead, an out-of-place write is performed to store the updated/modified data in the next available log that has sufficient vacancy to hold the new data, similar to a new write. This allows the LSA storage system to accommodate the size-change variability of compressed data since data is not allocated to a fixed storage location. As noted above, due to the continued creation of invalid log entries over time, the LSA layout requires maintenance defragmentation cycles to close "gaps" in the storage space which result from the invalid entries.

A defragmentation process involves rewriting a large portion of a log segment, or the entire log segment, after packing the valid log data entries together, such that all gaps in the log segment are closed, and all vacant regions of the log segment become contiguous. The implementation of the LSA layout, together with the necessity to have defragmentation cycles, imposes challenges with regard to certain types of storage media in which write amplification enhances the gradual wearing of the storage devices, ultimately rendering the devices unusable. This is the case with SSD storage media, which are becoming increasingly popular because of their superior access times as compared to magnetic disks. The write operations involved in the defragmentation cycles, where the same data is rewritten just for the sole purpose of maintenance, constitutes undesirable write amplification.

As mentioned above, metadata is utilized to determine data placement. In some implementations, each metadata entry corresponds to a large block of data, e.g., 1 GB of data. Such an implementation allows for features such as capacity allocation and thin provisioning. In some implementations, each metadata entry corresponds to a smaller block of data, e.g., 4 KB to 16 KB. Such an implementation may be utilized, for example, in a system that provides compression and deduplication where, for example, the finer granularity provides for greater deduplication. Smaller block sizes also have additional advantages in scenarios where snapshots are used since a snapshot may diverge from the original volume at fine granularity.

When such implementations use LSAs, for example, as described above, several potential performance problems may be avoided or inhibited. For example, reduced performance due to the servicing of random writes may be avoided by grouping the random writes into a single large write with metadata being used to read back the content of such composite blocks. Reduced performance of small updates to the parity RAID may be avoided or inhibited by such grouping. By grouping smaller writes into larger writes, the LSA allows the storage system to convert small user writes into full-stripe writes which may result in increased performance.

One tradeoff of using an LSA is that continuous addresses in a volume may be spread out over many physical locations. Likewise, a single physical chunk will contain data from many offsets from many volumes. This may lead to a dependency between otherwise unrelated data and metadata which may introduce some additional considerations when the cluster rebalances its processing, such as when new storage nodes are added to the cluster. For example, moving the processing for a range of addresses from one storage node to another storage node in the cluster may require a separation of the data and the metadata of the range of addresses that is moving from a range of addresses that is not being moved.

In some embodiments, scalability and flexibility of processing distribution may be achieved by assigning related data and metadata into silos, referred to herein as processing groups (e.g., processing groups 155), where each processing group is independent of the other processing groups. Each of these processing groups can be placed on and migrated to any storage node on the cluster. The association of a particular host write operation to a processing group may, for example, be based on the write operation's address or hash. An address-based association may define address ranges for each processing group while a hash-based association defines hash value ranges for each processing group. In some embodiments, both schemes may perform processing group allocation based on a quantity of processing groups per storage node. In some embodiments, the processing groups are defined to be large enough so that random writes can still be joined to a full stripe write, as described above, within each processing group. In some embodiments, the number and size of the processing groups may be large enough to be spread out over the storage nodes in a manner that is reasonably balanced.

In an architecture that uses local storage and processing, e.g., each storage node performs the processing and then stores the data on its own local devices, the distribution of the processing groups is dictated by available capacity. However, in a disaggregated architecture that stores the data on devices independently from the storage node that performs the processing, there is much more that can be done to optimize the utilization of the processing resources.

Utilizing processing groups in a disaggregated architecture may provide both advantages and challenges. For example, even though in an average use case the processing groups are of comparable size, it may be possible in some cases that one or more processing groups become bloated in relation to the other processing groups.

In one example scenario, a series of snapshots that are overwritten in an address that maps to the same processing group may significantly increase the size of that processing group as compared to an average processing group that has not been snapshotted.

In another example scenario, when the number of addresses covered by all of the processing groups is even, there is no guarantee that the required processing resources themselves are even. For example, if the data from a first processing group is read much more often than the data in a second processing group, the storage node hosting the first processing group may become overloaded while the storage node hosting the second processing group will remain underutilized. The fact that the focus of the workload may shift over time may also add to this potential issue as well since a static solution would not cover such a shift.

In software defined environments, the resources such as, e.g., the CPU, RAM, LAN, persistent memory, etc., that are available to each storage node may not be the same. In cases where the resources of each storage node are not the same or similar, distributing the processing groups evenly over all of the storage nodes may be inefficient and wasteful since some of those storage nodes can handle more load on a given type of resource than the other storage nodes. In one example scenario, a first storage node may comprise more of one resource than a second storage node. In another example, the first storage node may also comprise less of another resource than the second storage node. For example, the first storage node may comprise more CPU capability than the second storage node but less RAM than the second storage node. In some cases, a storage node may even lack a particular resource altogether, such as, e.g., persistent memory. Because of these differences between the resources of the storage nodes, a solution that evenly distributes the processing groups among the storage nodes simply based on the address or hash may not be fully optimized for highly scalable or software defined systems.

Figure 4:
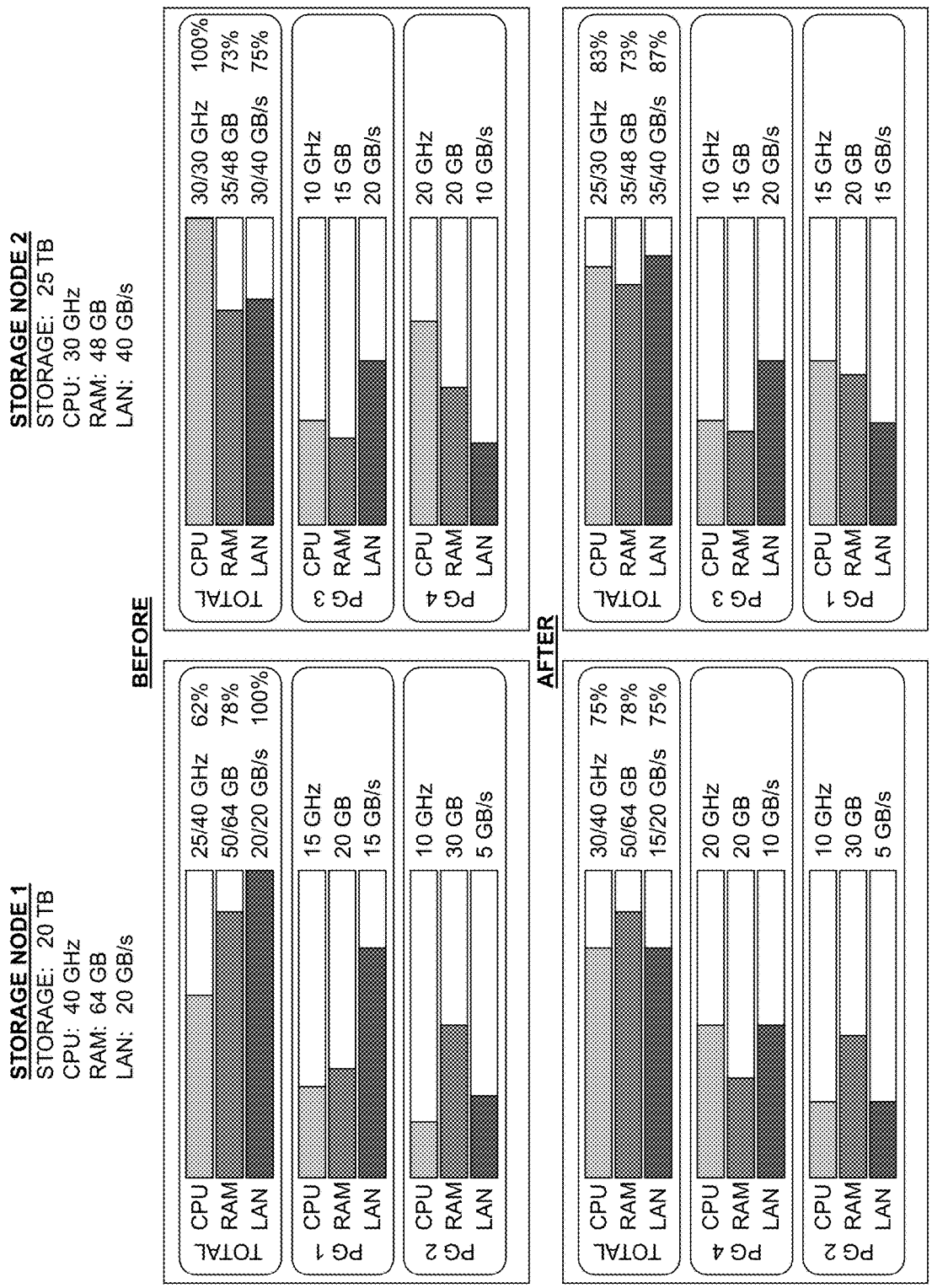
FIG. 4 shows an example of redistribution of processing groups in an illustrative embodiment.

With reference to FIGS. 1B and 4, in illustrative embodiments, storage control system 180 is configured to manage the distribution of the processing groups (e.g., processing groups 155) among the storage nodes (e.g., storage nodes 140). A processing-oriented approach to the distribution of the processing groups is implemented, as compared to the capacity-oriented approaches described above. In some embodiments, a resource-based criterion is used to determine a processing group's preferred placement on the storage nodes.

By utilizing a processing-oriented approach, the efficiency of the usage of the storage nodes of the storage system is improved. For example, the computing power of each storage node of the storage system may be broken down into multiple resources, e.g., CPU capability, memory, persistent memory, network bandwidth or other hardware resources of the storage nodes. In addition, the resource usage of each processing group is also broken down into the same categories. These resources are measured on a per storage node basis to determine which resource or resources if any are causing bottlenecks on the storage nodes. The resources are also measured on a per processing group basis to determine each processing group's contribution to the load on each resource for each storage node. When a bottleneck is identified on one or more of the storage nodes, one or more of the corresponding processing groups that are assigned to that storage node may be redistributed to one or more of the other storage nodes based on the measured resources of those processing groups and also the measured and available resources of that storage node and the other storage nodes.

In some cases, the processing groups of multiple storage nodes may be redistributed as needed to ensure that the occurrence of bottlenecks on the storage nodes is reduced as much as possible or even entirely removed. One example redistribution may comprise, for example, swapping processing groups between storage nodes. Another example redistribution may comprise moving a processing group from a first storage node to a second storage node, moving another processing group from the second storage node to a third storage node and moving yet another processing group from the third storage node to the first storage node. Any other redistribution of the processing groups between the server may be utilized. In some cases, a proximity of one storage node to another may also be utilized as a factor in the redistribution. As will be described in further detail below, the processing group distribution logic 195 may also factor in knowledge of the location of metadata copies (e.g., metadata copies 175) where metadata of the metadata storage containers (e.g., metadata storage containers 160) associated with the processing groups (e.g., processing groups 155).

As mentioned above, the measurement of the resources may be performed at two levels, per processing group and per storage node. This measurement information is obtained and used to balance the processing groups per storage node and across all storage nodes. The measurement information is utilized to determine how overloaded each storage node is, which processing group or groups need to be redistributed from the overloaded storage nodes and which storage node or storage nodes are preferred as destinations for those processing groups that need to be redistributed. The functionality for distributing (or redistributing) the processing group may be performed in one step or more than one step where, for example, it may be determined that multiple processing groups across a variety of storage nodes need to be redistributed among the storage nodes.

The cluster redistribution may be performed in a variety of ways. In a first example embodiment, a sorted list of processing groups per resource per storage node may be generated. The usage of each resource for each storage node is monitored and used to determine whether or not the usage of any of the resources for a given storage node exceeds a threshold amount of the capacity of the storage node for that resource, e.g., 70%, 80%, 90% or any other threshold amount. In the event that the usage of a particular resource exceeds the threshold amount for that resource on a given storage node, one or more of the processing groups for that resource may be relocated to a storage node that has sufficient capacity for that resource. In some embodiments, the most demanding processing group for that resource may be relocated to the storage node that has the lowest utilization of that resource if possible.

In a second example embodiment, various other resources may be factored in. This may be accomplished by utilizing a vector $\vec{U}$ per processing group where each resource is a component in the vector $\vec{U}$ for that processing group. In addition, a vector $\vec{N}_i$ per node may be utilized, where each resource is a component of the vector $\vec{N}_i$ for that storage node. In such an embodiment, a summation vector may be computed as $\vec{S}_i = \vec{N}_i + \vec{U}$, and the summation vector $\vec{S}_i$ is chosen for which none of the components are greater than 100% utilization and $|\vec{S}_i|$ is minimal.

In a third example embodiment, the summation vector $S_i$ may be calculated for all processing groups $\vec{U}_i$ and all nodes $\vec{N}_i$ thereby increasing accuracy in exchange for an increase in the complexity to O(i+j).

Various other processes for balancing the distribution and/or redistribution of the processing groups among the storage nodes may be used in other embodiments.

Utilizing the techniques described above, the storage control system 180 (e.g., the processing group distribution logic 195) may measure the usage of each resource individually, determine on a per storage node basis which resource is a bottleneck, and redistribute a processing group from a storage node that has a high consumption of the overutilized resource to a storage node that has a lower consumption of that resource. The selection of the storage node having the lower consumption of that resource, as will be discussed in further detail below, may further be based on knowledge of which of the storage nodes currently have metadata copies storing metadata of the metadata storage container associated with the processing group to be redistributed.

An example scenario utilizing these techniques and processes will now be described with reference to FIG. 4. As shown in the example scenario of FIG. 4, storage node 1 comprises 20 TB of storage capacity, 40 GHz of CPU capacity, 64 GB of RAM and 20 GB/s of LAN bandwidth while storage node 2 comprises 25 TB of storage capacity, 30 GHz of CPU capacity, 48 GB of RAM and 40 GB/s of LAN bandwidth. As shown in FIG. 4, a processing group is denoted as "PG."

In the example scenario of FIG. 4, processing groups 1 and 2 have been assigned to storage node 1 while processing groups 3 and 4 have been assigned to storage node 2 before any balancing is performed by processing group distribution logic 195. Processing group distribution logic 195 measures the resource usage to obtain measurement information about the storage nodes and their assigned process groups for each resource.

The measurement information for storage node 1 shows that processing group 1 utilizes 15 GHz of CPU, 20 GB of RAM and 15 GB/s of LAN bandwidth and processing group 2 utilizes 10 GHz of CPU, 30 GB of RAM and 5 GB/s of LAN bandwidth. As can be seen in FIG. 4, the total usage for storage node 1, based on the usage of processing groups 1 and 2, is 25/40 GHz of CPU (62%), 50/64 GB of RAM (78%) and 20/20 GB/s of LAN bandwidth (100%).

The measurement information for storage node 2 shows that processing group 3 utilizes 10 GHz of CPU, 15 GB of RAM and 20 GB/s of LAN bandwidth and processing group 4 utilizes 20 GHz of CPU, 20 GB of RAM and 10 GB/s of LAN bandwidth. As can be seen in FIG. 4, the total usage for storage node 2, based on the usage of processing groups 3 and 4, is 30/30 GHz of CPU (100%), 35/48 GB of RAM (73%) and 30/40 GB/s of LAN bandwidth (75%).

Based on this measurement information, the storage control system 180 determines that the LAN usage of 100% for storage node 1 exceeds a threshold amount of LAN usage, e.g., 90%. The storage control system may also determine that the CPU usage of 100% for storage node 2 exceeds a threshold amount of CPU usage, e.g., 90%.

In the first example embodiment described above, it is determined that processing group 1 is the processing group on storage node 1 with the highest amount of LAN usage at 15 GB/s, the processing group 1 is selected for redistribution and the processing group 1 is redistributed to the storage node with the lowest amount of LAN usage. Similarly, it is determined that the processing group 4 is the processing group on storage node 2 with the highest amount of CPU usage at 20 GHz, the processing group 4 is selected for redistribution, and the processing group 4 is distributed to the storage node with the lowest amount of CPU usage.

In some embodiments, the storage control system may also ensure that the destination storage node has sufficient capacity to handle the resources of the redistributed processing groups in addition to the resource usage of any processing groups that are already assigned to that storage node without exceeding the corresponding threshold amounts of usage for those resources for that storage node. In some embodiments, the redistribution further takes into account where metadata copies are stored. For example, each of the processing groups may be associated with a metadata storage container, with multiple metadata copies of the metadata storage containers being stored on different ones of the storage nodes. If possible, a processing group is redistributed to a storage node which already stores a metadata copy of the processing group's metadata storage container.

In the second example embodiment described above, the vector of resources is generated for each of the processing groups 1, 2, 3 and 4 and each of storage nodes 1 and 2 to determine the preferred destination for a given processing group. For example, as seen in FIG. 4, the vectors may indicate that a swap of units 1 and 4 between storage nodes 1 and 2 results in usage levels that are below the threshold amounts for each resource for each storage node.

For example, as seen in FIG. 4, after the redistribution, the measurement information for storage node 1 shows that processing group 4 utilizes 20 GHz of CPU, 20 GB of RAM and 10 GB/s of LAN bandwidth and processing group 2 utilizes 10 GHz of CPU, 30 GB of RAM and 5 GB/s of LAN bandwidth. As can be seen in FIG. 4, the total usage for storage node 1 after the redistribution, based on the usage of processing groups 4 and 2, is 30/40 GHz of CPU (75%), 50/64 GB of RAM (78%) and 15/20 GB/s of LAN bandwidth (75%).

In addition, after the redistribution, the measurement information for storage node 2 shows that processing group 3 utilizes 10 GHz of CPU, 15 GB of RAM and 20 GB/s of LAN bandwidth and processing group 1 utilizes 15 GHz of CPU, 20 GB of RAM and 15 GB/s of LAN bandwidth. As can be seen in FIG. 4, the total usage for storage node 2 after the redistribution, based on the usage of processing groups 3 and 1, is 25/30 GHz of CPU (83%), 35/48 GB of RAM (73%) and 35/40 GB/s of LAN bandwidth (87%).

In this manner, processing groups have been redistributed such that the bottlenecks to the LAN bandwidth of storage node 1 and the CPU of storage node 2 are alleviated.

In some embodiments, another factor that may be integrated into the selection of a destination storage node for distribution is the proximity of the processing group to its interfacing host devices. For example, in some cases the data in an address range may often be written to or read from by the same host device. With the flexibility in processing group placement, it is possible to favor redistribution or assignment of the processing groups to the storage node or nodes to which the host device is sending the data. In some cases, a proximity to other interfaces may also be considered in a factor for the distribution of the processing groups including, for example, proximity to persistent memory, proximity to high-speed storage devices that serve as a cache or proximity to other interfaces, where the proximity may be measured using a time to access or a number of resources spent to access. As noted above and elsewhere herein, some embodiments further factor in which of the storage nodes store the metadata copies of the metadata storage containers associated with the processing groups.

Processing group redistribution is especially suitable to a disaggregated architecture in which location of the data is independent of the location of the processing groups because redistribution of the processing groups does not entail any data movement (though it may entail metadata movement). Even so, the redistribution of processing groups may not be instantaneous. For example, depending on the implementation, such a redistribution may require operations such as, e.g., flushing cached data, quiescing the IO operations to the processing group, loading metadata to RAM at the new destination storage node and updating distribution tables. While these operations are much cheaper than moving data, excessive amounts of redistribution may induce a performance impact on the storage system. For example, it may not be beneficial for a processing group with a high fluctuation rate of resource utilization to continuously be relocated. In such cases, the average utilization of the resources by the processing groups may be measured over a period of time, e.g., seconds, minutes or any other period of time. Once a stable average measurement is achieved, processing groups may be selected for redistribution if the expected gain in resource reduction is sufficiently large, e.g., a 10% gain.

Processing group distribution functionality (e.g., such as that provided by the processing group distribution logic 195) provides the storage system with the ability to match and redistribute processing groups to appropriate storage nodes based on the usage of one or more resources and the location of metadata copies. The size of the processing groups is less relevant and the workload is instead shifted between the storage nodes as needed based on the specific resource consumption of each processing group in conjunction with the diversified capabilities of the various storage nodes in the cluster. Such resource-based redistribution provides performance gains over a simple redistribution of the processing groups evenly among the storage nodes.

As discussed above, scalable storage systems may be implemented using a two-layer, disaggregated architecture. The first layer (e.g., a processing layer) handles the processing of the data and uses various resources such as processing resources (e.g., central processing unit (CPU) resources), memory resources (random-access memory (RAM) resources), etc. The second layer (e.g., a storage layer) handles storage of the data and uses various resources such as network resources, storage resources, etc.

As shown in FIG. 1B, the processing layer 150 implements the processing groups 155 (also referred to as "processing units"), where each of the processing groups 155 may be configured to handle a small portion of the overall storage workload of the data storage system 130. Although FIG. 1B shows just a single one of the storage nodes 140 of the data storage system 130, it should be appreciated that the processing layer 150 and/or the storage layer 165 may span multiple ones of the storage nodes 140 of the data storage system 130. For example, each (or at least a subset of) the storage nodes 140 of the data storage system 130 may implement one or more processing groups as part of the processing layer 150 and/or may comprise one or more storage devices 170 forming part of the storage layer 165.

The processing groups 155 may be distributed (and re-distributed) around the different storage nodes 140 of the data storage system 130 (e.g., based on node availability, resource utilization, etc.) as discussed above. For example, the data storage system 130 may comprise a clustered storage system comprising a plurality of servers (e.g., storage nodes 140). The processing layer 150 communicates with the storage layer 165 without having to know where the data is actually stored on the storage devices 170. The storage layer 165 may handle, for example, data protection and data storage in a resilient and distributed manner over the storage nodes 140 of the data storage system 130. To do so, the storage layer 165 may consider various factors such as capacity utilization, failure dependencies among the storage nodes 140, etc. The storage devices 170 may be located on the same server(s) implementing the processing layer 150, or may be stored separately on external enclosures (e.g., a "just a bunch of flash" (JBOF) or "just a bunch of drives" (JBOD) enclosure).

The disaggregated architecture of the processing layer 150 and the storage layer 165 which are distributed across the storage nodes 140 of the data storage system 130 provides many technical advantages, including in scalability, performance, flexibility of cluster configuration, etc. The disaggregated architecture, however, may also present technical challenges including some performance inefficiencies. One such issue is the ability to quickly access metadata that is not in memory. To access the metadata, the processing layer 150 must perform a read from the storage layer 165. Since the storage layer 165 is independent, it may store the metadata on one of the storage nodes 140 based on its own internal considerations (e.g., capacity) leading to having metadata stored on "remote" servers (e.g., the metadata needed by a particular processing group or processing unit may not be stored locally on storage devices of the storage node on which that processing group or processing unit is currently running). Since metadata access may be a key to performance (e.g., most notably latency), it would be advantageous if it were possible to utilize the disaggregated architecture but still have metadata be "local" to the processing group or processing unit that accesses it.

In the data storage system 130, it is assumed that the amount of metadata to be stored is significantly less than the amount of data to be stored. Most typical workloads meet these requirements. This allows the data storage system 130, for example, to take capacity into account for placement of data while ignoring (or at least reducing the impact or weight accorded to) capacity when placing metadata. The storage control system 180 implements various logic providing functionality for optimizing latency of metadata access in the data storage system 130 (e.g., utilizing a disaggregated architecture). The storage control system 180 comprises metadata mirroring logic 185, metadata copy distribution logic 190, and processing group distribution logic 195. As part of the disaggregated architecture of the data storage system 130, metadata is divided based on the processing groups 155. Each of the processing groups 155 has its own metadata that can be stored independently of other ones of the processing groups 155. For example, each of the processing groups 155 is associated with its own metadata storage container 160 whereby content can be associated with the owning processing groups 155. This association allows for the independent metadata storage containers 160 to move along with processing groups 155 across different ones of the storage nodes 140 of the data storage system 130 (e.g., if the processing group 155-1 were moved to a different storage node, then its associated metadata storage container 160-1 may be moved along with it).

When the processing layer 150 stores metadata to the storage layer 165, a flag or other suitable mechanism is used that distinguishes between metadata and data. The storage layer 165, on receiving metadata (e.g., identified via a "metadata" flag or other mechanism), will mirror the metadata as directed by the metadata mirroring logic 185 of the storage control system 180. The metadata mirroring logic 185 determines a type of mirroring to be utilized (e.g., two full copies for a system supporting a single failure, three full copies for a system supporting two concurrent failures, etc.). Mirroring is often used for metadata for other reasons as well (e.g., not just for protecting against single or concurrent failures). For example, metadata mirroring can avoid the issue of read-modify-write in a parity Redundant Array of Independent Disks (RAID) when updating less than a full stripe.

Instead of distributing each of the metadata copies over all the storage nodes 140 in the data storage system 130, each of the metadata copies may be placed on a single one of the storage nodes 140. For example, if mirroring is configured to support two concurrent failures such that there are three copies of the metadata, then those three copies may be stored on three of the storage nodes 140 of the data storage system 130. It should be noted that this does not contradict the distributed architecture principle, because there are many processing groups and between them all, the metadata in the data storage system 130 is still distributed. Additionally, within each of the storage nodes 140, a metadata copy may be distributed across all of the storage devices within that storage node.

The metadata copy distribution logic 190 of the storage control system 180 is configured to provide functionality for enabling "localized" metadata copies. The metadata copy distribution logic 190 may utilize best effort logic to co-locate the processing groups 155 and one of the mirrored copies of their associated metadata storage containers 160 on the same server (e.g., the same storage node 140). For example, best efforts are utilized such that one of the mirrored copies of the metadata of the metadata storage container 160-1 of the processing group 155-1 is stored on the storage devices 170 (e.g., as one of the metadata copies 175) of the same storage node 140. To implement localized metadata copies, the metadata copy distribution logic 190 will pass various information between the processing layer 150 and the storage layer 165. To provide the required information sharing between the processing layer 150 and the storage layer 165 while preserving their decoupling, the following information may be added to the storage layer 165's interface: storage container identifiers (IDs) and their association to opaque IDs representing the processing groups 155; the storage container's type of content (e.g., data or metadata) which can be abstracted to local/distributed; and one or more preferred locations (e.g., ones of the storage nodes 140) on which to strive to place the mirrored copies of the metadata storage containers 160 in order to align with the locations of their associated processing groups 155.

The storage control system 180, in some embodiments, utilizes the processing group distribution logic 195 to determine the locations where the processing groups 155 should be deployed (e.g., among the multiple storage nodes 140 of the data storage system 130) based on node strength/health (e.g., available CPU, RAM, etc.). The processing group distribution logic 195 is also configured to determine preferred failover locations for the processing groups 155 (e.g., a preferred one or ranking of the storage nodes 140 as failover locations). Each of the processing groups 155 creates its associated one of the metadata storage containers 160, and the processing group distribution logic 195 provides the preferred locations (e.g., which of the storage nodes 140 that the processing groups 155 should be deployed on, as well as preferred failover locations) to the storage layer 165. If possible, the storage layer 165 places the metadata copies 175 for the processing groups 155 on the requested or preferred ones of the storage nodes 140. It should be noted that this may be a "best effort" only approach in some embodiments. For example, if a preferred one of the storage nodes 140 has no storage devices, or is out of capacity on its storage drives, or has another type of restriction, the metadata copies 175 for the metadata storage containers 160 of the processing groups 155 may be stored "remotely" (e.g., relative to the storage nodes 140 on which the processing groups 155 are deployed). It should be noted that even if one or more of the metadata copies 175 are placed remotely, the associated ones of the processing groups 155 will still function they just will not benefit from metadata localization optimization.

The processing group distribution logic 195 may also be configured to manage the movement of the processing groups 155 among the storage nodes 140 of the data storage system 130. The processing groups 155 may be moved for various reasons, including for optimizing processing balancing of the processing layer 150 across the storage nodes 140 (e.g., if one of more of the storage nodes 140 become overloaded from a processing perspective, then one or more of the processing groups 155 currently deployed on such overloaded ones of the storage nodes 140 may be moved to other ones of the storage nodes 140). In such cases, the processing group distribution logic 195 may seek to move the processing groups 155 to new locations on different storage nodes 140, where the new locations are selected (e.g., on a best effort basis) to achieve metadata localization optimization. For example, the selection may be based on the preferred failover locations associated with the processing groups 155, where mirrored copies of the metadata are already stored on other ones of the storage nodes 140 (e.g., such that when a given one of the processing groups 155 is moved to a given one of the storage nodes 140, the given storage node already has a locally stored mirrored copy of the metadata utilized by the given processing group and thus will benefit from the added performance provided by metadata localization). If there is a node failure of one or more of the storage nodes 140, then ones of the processing groups 155 which were on the failed storage node will be respawned on other ones of the storage nodes 140. The selection of such other ones of the storage nodes 140 may similarly utilize the preferred failover locations and/or knowledge of which of the storage nodes 140 already contain metadata copies for the processing groups to be respawned.

In some embodiments, the storage control system 180 may provide the capability for monitoring the load of the processing layer 150 and the storage layer 165, including the load of each of the storage nodes 140 which form part of the processing layer 150 and/or the storage layer 165. Such load information may be used for directing distribution (or redistribution) of the processing groups 155 and/or the metadata copies 175 across the storage nodes 140. Consider, for example, a given one of the metadata copies 175 that is stored on the storage devices 170 of storage node 140. If the storage layer 165 of the storage node 140 on which the given metadata copy 175 is stored is "overloaded" (e.g., it has very few storage devices 170, its storage devices 170 have low capacity or are otherwise subject to high load conditions, etc.), then a given one of the processing groups 155 which accesses the given metadata copy 175 may mix "local" access to the given metadata copy 175 on the storage node 140 with "remote" access to mirrored copies of the metadata on other ones of the storage nodes 140. Further, the storage control system 180 may provide functionality for avoiding rebuilding to a single storage node when one of the storage nodes 140 fails by rebuilding to a distributed copy to restore system resilience, and later reconverge the copy to a single location.

The technical solutions described herein provide various technical advantages, including reduced latency (e.g., as metadata localization optimization can remove the latency of network transfer for "remote" metadata reads) and reduced network bandwidth (e.g., as "local" metadata reads to locally stored metadata copies does not require network communication among different ones of the storage nodes 140). The technical solutions described herein further provide full support for fallback cases when localization is not possible, and preserve the disaggregated architecture of the data storage system 130 as well as the decoupling of the processing layer 150 and the storage layer 165. Further, the technical solutions do not require dedicated high-performance hardware for metadata and can further be used only when beneficial. In some embodiments, metadata locality optimization is "best effort" only and not a requirement, and thus imposes no restrictions. Even though metadata localization optimization is a best effort optimization, it is applicable to various common use cases. The technical solutions do generate metadata movement when moving processing groups, and are thus particularly advantageous when processing groups do not move frequently.

The technical solutions, in some embodiments, implement functionality for containerizing metadata on a per-processing group basis (e.g., the metadata storage containers 160 associated with the processing groups 155 as shown in FIG. 1B), and further utilize mirroring for metadata (e.g., the metadata in each of the metadata storage containers 160 is mirrored as metadata copies 175 on multiple different ones of the storage nodes 140). Metadata "capacity" is assigned in some embodiments based on processing resource considerations, instead of or in addition to storage capacity considerations. Further, failover logic is provided such that the processing groups 155 will prefer to failover to ones of the storage nodes 140 which already have stored therein local metadata copies for the metadata in the associated metadata storage containers 160. Further, metadata may "follow" the location of the processing groups 155 in the event of re-balancing the processing groups 155 across the storage nodes 140 of the data storage system 130.

In some approaches, a storage system may keep all metadata in memory (e.g., in RAM), which provides good performance. Such approaches, however, are not appropriate for scalable storage systems. Further, some storage systems utilize a dual node architecture where two nodes share storage devices to which each have direct access. In such an arrangement all data and metadata are local and the problem of remote metadata access does not exist. For highly scalable SDS systems, another approach is to not use a disaggregated architecture in which case each node contains its own data and metadata. Such an approach, however, does not have the benefits provided through use of a disaggregated architecture.

Figure 5:
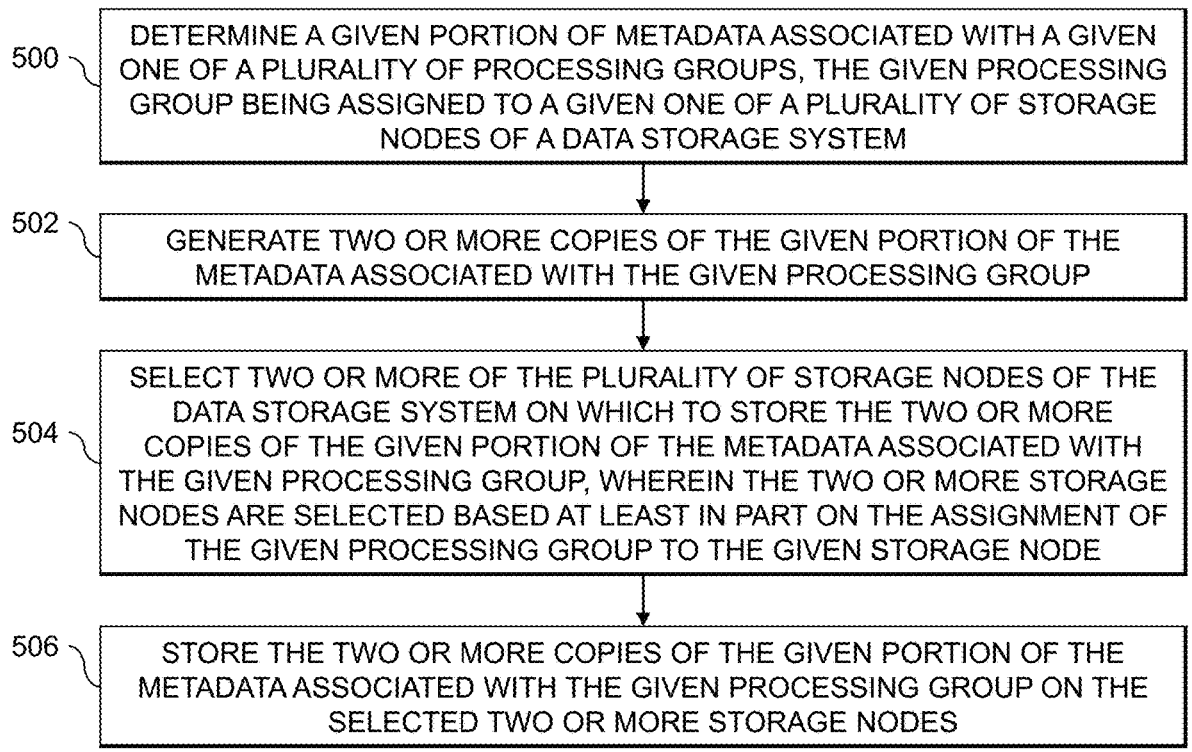
FIG. 5 is a flow diagram of an exemplary process for distribution of copies of metadata associated with processing groups among storage nodes of a data storage system in an illustrative embodiment.

FIG. 5 is a flow diagram of a process for distribution of copies of metadata associated with processing groups among storage nodes of a data storage system according to an exemplary embodiment of the disclosure. The process as shown in FIG. 5 includes steps 500 through 506. For purposes of illustration, the process flow of FIG. 5 will be discussed in the context of the storage control system 180 of FIG. 1B.

At step 500, a given portion of metadata associated with a given one of a plurality of processing groups (e.g., processing groups 155) is determined. The given processing group is assigned to a given one of a plurality of storage nodes (e.g., storage nodes 140) of a data storage system (e.g., data storage system 130). Determining the given portion of the metadata associated with the given processing group may be based at least in part on a mapping of a metadata storage container identifier with an identifier of the given processing group. Determining the given portion of the metadata associated with the given processing group may also or alternatively be based at least in part on flags distinguishing the metadata from data stored in the data storage system. The data storage system may utilize a disaggregated architecture comprising a processing layer (e.g., processing layer 150) and a storage layer (e.g., storage layer 165) each distributed across two or more of the plurality of storage nodes of the data storage system.

At step 502, two or more copies (e.g., metadata copies 175) of the given portion of the metadata associated with the given processing group are generated.

At step 504, two or more of the plurality of storage nodes of the data storage system are selected on which to store the two or more copies of the given portion of the metadata associated with the given processing group. The two or more storage nodes are selected based at least in part on the assignment of the given processing group to the given storage node. The given storage node may be one of the selected two or more storage nodes. The two or more storage nodes may also or alternatively be selected based at least in part on one or more preferred failover locations for the given processing group. The two or more storage nodes may further or alternatively be selected based at least in part on storage capacity of the plurality of storage nodes of the data storage system.

At step 506, the two or more copies of the given portion of the metadata associated with the given processing group are stored on the selected two or more storage nodes. A given one of the two or more copies of the given portion of the metadata associated with the given processing group may be stored on a single one of the plurality of storage nodes of the data storage system. A given one of the two or more copies of the given portion of the metadata associated with the given processing group may be distributed across two or more storage devices of a single one of the plurality of storage nodes of the data storage system.

In some embodiments, the FIG. 5 process may further include, responsive to determining that the given processing group is to be re-assigned from the given storage node to another one of the plurality of storage nodes of the data storage system, determining whether any of the two or more copies of the given portion of the metadata associated with the given processing group is stored on the other storage node. Responsive to determining that none of the two or more copies of the given portion of the metadata associated with the given processing group are stored on the other storage node, a given one of the two or more copies of the given portion of the metadata associated with the given processing group is moved to the other storage node. The given copy of the given portion of the metadata associated with the given processing group may be moved to the other storage node prior to movement of the given processing group from the given storage node to the other storage node.

The FIG. 5 process may further include, responsive to determining that the given processing group is to be re-assigned from the given storage node, selecting another one of the plurality of storage nodes of the data storage system to re-assign the given processing group to based at least in part on the selected two or more storage nodes of the data storage system on which the two or more copies of the given portion of the metadata associated with the given processing group are stored.

Responsive to detecting failure of the given storage node, the FIG. 5 process may include deploying the given processing group on another one of the plurality of storage nodes of the data storage system. The other storage node may be selected based at least in part on the selected two or more storage nodes of the data storage system on which the two or more copies of the given portion of the metadata associated with the given processing group are stored.

The particular processing operations and other system functionality described above in conjunction with the flow diagram of FIG. 5 are presented by way of illustrative examples only, and should not be construed as limiting the scope of the disclosure in any way. Alternative embodiments can use other types of processing operations for implementing functionality for distribution of copies of metadata associated with processing groups among storage nodes of a data storage system. For example, the ordering of the process steps may be varied in other embodiments, or certain process steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 5 can be implemented at least in part in the form of one or more software programs stored in memory and executed by a processor of a processing device such as a computer or server.

Figure 6:
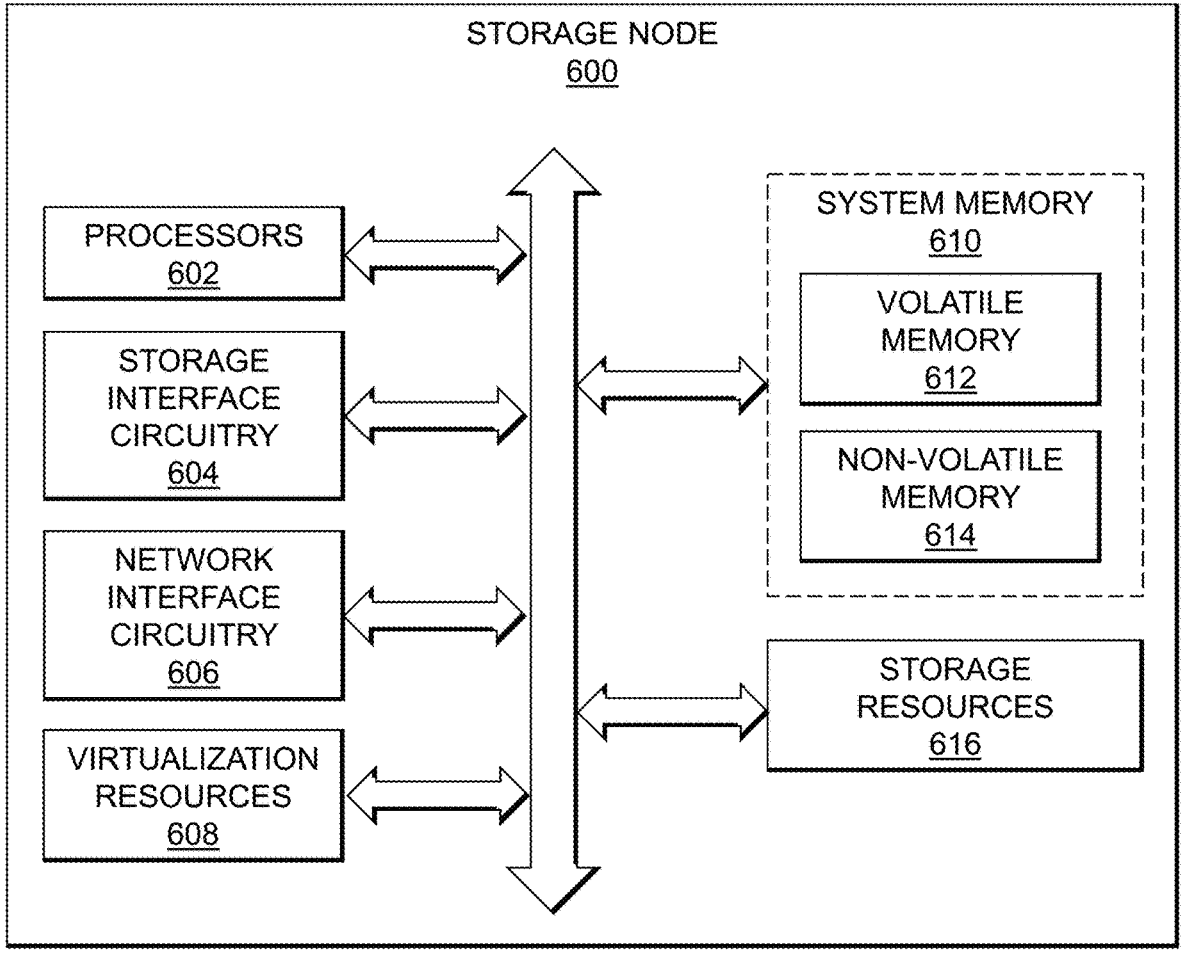
FIG. 6 schematically illustrates an example framework of a storage node for implementing a storage node of a storage system in illustrative embodiments.

FIG. 6 schematically illustrates a framework of a storage node 600 (e.g., one or more the compute nodes 110 and/or storage nodes 140 in the information processing system 100 of FIGS. 1A and 1B) which can be implemented for hosting a storage control system (e.g., the storage control system 180, FIG. 1B). The storage node 600 comprises processors 602, storage interface circuitry 604, network interface circuitry 606, virtualization resources 608, system memory 610, and storage resources 616. The system memory 610 comprises volatile memory 612 and non-volatile memory 614.

The processors 602 comprise one or more types of hardware processors that are configured to process program instructions and data to execute a native operating system (OS) and applications that run on the storage node 600. For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 606 enables the storage node 600 to interface and communicate with a network and other system components. The network interface circuitry 606 comprises network controllers such as network cards and resources (e.g., network interface controllers (NICs) including SmartNICs, RDMA-enabled NICs, etc., Host Bus Adapter (HBA) cards, Host Channel Adapter (HCA) cards, IO adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the storage node 600. For example, the virtualization resources 608 can be configured to implement the various modules and functionalities of the storage control system 180 as shown in FIG. 1B as discussed herein. In some embodiments, the virtualization resources 608 comprise virtual machines that are implemented using a hypervisor platform which executes on the storage node 600, wherein one or more virtual machines can be instantiated to execute functions of the storage node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the storage node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the storage node 600 as well as execute one or more of the various modules and functionalities of the storage control system 180 of FIG. 1B as discussed herein. In yet other embodiments, containers may be used in combination with other virtualization infrastructure such as virtual machines implemented using a hypervisor, such as where Docker containers or other types of LXCs are configured to run on virtual machines in a multi-tenant environment.

In some embodiments, the various components, systems, and modules of the storage control system 180 comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module)), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (e.g., data is accessed with loads and stores, instead of with IO reads and writes). The term "memory" or "system memory" as used herein refers to volatile and/or non-volatile memory which is utilized to store application program instructions that are read and processed by the processors 602 to execute a native operating system and one or more applications or processes hosted by the storage node 600, and to temporarily store data that is utilized and/or generated by the native OS and application programs and processes running on the storage node 600. The storage resources 616 can include one or more HDDs, SSD storage devices, etc.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to determine a given portion of metadata associated with a given one of a plurality of processing groups, the given processing group being assigned to a given one of a plurality of storage nodes of a data storage system;
        to generate two or more copies of the given portion of the metadata associated with the given processing group;
        to select two or more of the plurality of storage nodes of the data storage system on which to store the two or more copies of the given portion of the metadata associated with the given processing group, wherein the two or more storage nodes are selected based at least in part on the assignment of the given processing group to the given storage node;
        to store the two or more copies of the given portion of the metadata associated with the given processing group on the selected two or more storage nodes; and
        to re-assign the given processing group from the given storage node to another one of the plurality of storage nodes of the data storage system, the other storage node being selected based at least in part on which of the plurality of storage nodes of the data storage system are selected to store the two or more copies of the given portion of the metadata associated with the given processing group.

2. The apparatus of claim 1 wherein the given storage node is one of the selected two or more storage nodes.

3. The apparatus of claim 1 wherein the two or more storage nodes are further selected based at least in part on one or more preferred failover locations for the given processing group.

4. The apparatus of claim 1 wherein the two or more storage nodes are further selected based at least in part on storage capacity of the plurality of storage nodes of the data storage system.

5. The apparatus of claim 1 wherein determining the given portion of the metadata associated with the given processing group is based at least in part on a mapping of a metadata storage container identifier with an identifier of the given processing group.

6. The apparatus of claim 1 wherein determining the given portion of the metadata associated with the given processing group is based at least in part on flags distinguishing the metadata from data stored in the data storage system.

7. The apparatus of claim 1 wherein a given one of the two or more copies of the given portion of the metadata associated with the given processing group is stored on a single one of the plurality of storage nodes of the data storage system.

8. The apparatus of claim 1 wherein a given one of the two or more copies of the given portion of the metadata associated with the given processing group is distributed across two or more storage devices of a single one of the plurality of storage nodes of the data storage system.

9. The apparatus of claim 1 wherein the at least one processing device is further configured:
    responsive to determining that the given processing group is to be re-assigned from the given storage node to the other storage node, to determine whether any of the two or more copies of the given portion of the metadata associated with the given processing group is stored on the other storage node; and
    responsive to determining that none of the two or more copies of the given portion of the metadata associated with the given processing group are stored on the other storage node, to move a given one of the two or more copies of the given portion of the metadata associated with the given processing group to the other storage node.

10. The apparatus of claim 9 wherein the given copy of the given portion of the metadata associated with the given processing group is moved to the other storage node prior to movement of the given processing group from the given storage node to the other storage node.

11. The apparatus of claim 1 wherein re-assigning the given processing group is responsive to detecting failure of the given storage node, and wherein re-assigning the given processing group comprises deploying the given processing group on the other storage node.

12. The apparatus of claim 11 wherein the other storage node is one of the selected two or more storage nodes of the data storage system on which the two or more copies of the given portion of the metadata associated with the given processing group are stored.

13. The apparatus of claim 1 wherein the data storage system utilizes a disaggregated architecture comprising a processing layer and a storage layer each distributed across two or more of the plurality of storage nodes of the data storage system.

14. A computer program product comprising a non-transitory processor-readable storage medium having stored therein program code of one or more software programs, wherein the program code when executed by at least one processing device causes the at least one processing device:

to determine a given portion of metadata associated with a given one of a plurality of processing groups, the given processing group being assigned to a given one of a plurality of storage nodes of a data storage system;

to generate two or more copies of the given portion of the metadata associated with the given processing group;

to select two or more of the plurality of storage nodes of the data storage system on which to store the two or more copies of the given portion of the metadata associated with the given processing group, wherein the two or more storage nodes are selected based at least in part on the assignment of the given processing group to the given storage node;

to store the two or more copies of the given portion of the metadata associated with the given processing group on the selected two or more storage nodes; and to re-assign the given processing group from the given storage node to another one of the plurality of storage nodes of the data storage system, the other storage node being selected based at least in part on which of the plurality of storage nodes of the data storage system are selected to store the two or more copies of the given portion of the metadata associated with the given processing group.

15. The computer program product of claim 14 wherein the given storage node is one of the selected two or more storage nodes.

16. The computer program product of claim 14 wherein the two or more storage nodes are further selected based at least in part on one or more preferred failover locations for the given processing group.

17. A method comprising:

determining a given portion of metadata associated with a given one of a plurality of processing groups, the given processing group being assigned to a given one of a plurality of storage nodes of a data storage system;

generating two or more copies of the given portion of the metadata associated with the given processing group;

selecting two or more of the plurality of storage nodes of the data storage system on which to store the two or more copies of the given portion of the metadata associated with the given processing group, wherein the two or more storage nodes are selected based at least in part on the assignment of the given processing group to the given storage node;

storing the two or more copies of the given portion of the metadata associated with the given processing group on the selected two or more storage nodes; and re-assigning the given processing group from the given storage node to another one of the plurality of storage nodes of the data storage system, the other storage node being selected based at least in part on which of the plurality of storage nodes of the data storage system are selected to store the two or more copies of the given portion of the metadata associated with the given processing group;

wherein the method is performed by at least one processing device comprising a processor coupled to a memory.

18. The method of claim 17 wherein the given storage node is one of the selected two or more storage nodes.

19. The method of claim 17 wherein the two or more storage nodes are further selected based at least in part on one or more preferred failover locations for the given processing group.

20. The method of claim 17 further comprising:

responsive to determining that the given processing group is to be re-assigned from the given storage node to the other storage node, determining whether any of the two or more copies of the given portion of the metadata associated with the given processing group is stored on the other storage node; and responsive to determining that none of the two or more copies of the given portion of the metadata associated with the given processing group are stored on the other storage node, moving a given one of the two or more copies of the given portion of the metadata associated with the given processing group to the other storage node.

* * * * *